United States Patent
Sundell et al.

(10) Patent No.: US 9,232,544 B2
(45) Date of Patent: Jan. 5, 2016

(54) CONNECTION STATES FOR A USER ENTITY IN A SERVING GATEWAY OF AN EVOLVED PACKET CORE SYSTEM

(75) Inventors: Hans-Olof Sundell, Kalvsund (SE); Tony Olsson, Nösund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 348 days.

(21) Appl. No.: 13/699,374

(22) PCT Filed: May 26, 2010

(86) PCT No.: PCT/EP2010/057230
§ 371 (c)(1),
(2), (4) Date: Nov. 21, 2012

(87) PCT Pub. No.: WO2011/147446
PCT Pub. Date: Dec. 1, 2011

(65) Prior Publication Data
US 2013/0064158 A1 Mar. 14, 2013

(51) Int. Cl.
*G08C 17/00* (2006.01)
*H04W 76/02* (2009.01)
(Continued)

(52) U.S. Cl.
CPC .............. *H04W 76/02* (2013.01); *H04W 76/06* (2013.01); *H04W 88/16* (2013.01)

(58) Field of Classification Search
CPC .. H04W 52/02; H04W 52/0203; H04W 84/12
USPC ............... 370/310.2, 311, 310, 314
See application file for complete search history.

(56) References Cited

U.S. PATENT DOCUMENTS

2009/0170426 A1* 7/2009 Jung et al. .......................... 455/7
2010/0061331 A1* 3/2010 Guo et al. ..................... 370/329
(Continued)

FOREIGN PATENT DOCUMENTS

EP 2139190 A1 12/2009
WO WO 2008095936 A2 * 8/2008

OTHER PUBLICATIONS

UMTS/LTE/EPS/GPRS Tunnelling Protocol for Control plane (GTPv2-C), Apr. 2009, ETSI TS 129 274 V8.1.1, p. 14-18.*
(Continued)

*Primary Examiner* — Hassan Phillips
*Assistant Examiner* — Siren Wei
(74) *Attorney, Agent, or Firm* — Coats & Bennett, P.L.L.C.

(57) ABSTRACT

A serving gateway node (SGW) and a method therefore is being provided being adapted for operating in a network in which a control-plane tunnel between a mobility managemen! entity (MME) and a serving gateway node (SGW), a control plane tunnel between the serving gateway node (SGW) and a packet gateway node (PGW), and one or more user plane tunnels between the serving gateway node (SGW) and the packet gateway node (PGW), may be set up, the serving gateway (SGW) comprising an application layer control mechanism (APL LR CTRL), interface means, (!F) and a data base (DB). The serving gateway (SGW) is adapted for entering a state of ECM-IDLE (108) and ECM-CONNECTED (110) for a user entity (UE) in question. The serving gateway upon reception of a Modify Bearer Request message (107) may effectuate a setting up one or more user plane tunnels between the serving gateway (SGW) and a base station (eNodeB). The serving gateway (SGW) is being adapted to, upon receiving a Create Session Request message (102) from a packet gateway node, set up a timer (105), which on time-out (114) effectuates the serving gateway to put the user entity in ECM-IDLE (108) even if no Modify Bearer Request (107) is received.

6 Claims, 9 Drawing Sheets

(51) Int. Cl.
*H04W 76/06* (2009.01)
*H04W 88/16* (2009.01)

(56) References Cited

U.S. PATENT DOCUMENTS

| | | | |
|---|---|---|---|
| 2010/0124223 A1 | 5/2010 | Gibbs et al. | |
| 2010/0208596 A1* | 8/2010 | Jin | 370/242 |
| 2011/0075675 A1* | 3/2011 | Koodli et al. | 370/401 |

OTHER PUBLICATIONS

3rd Generation Partnership Project, "P-CR (TS24.301), Adding E-UTRAN Deactivate ISR Timer Description", Vodafone; 3GPP TSG CT WG1 Meeting #56, Shanghai, P.R. China, Nov. 10-14, 2008; C1-084765; p. 1-6; Mobile Competence Centre; 650, Route Des Lucioles, F-06921 Sophia-Antipolis Cedex, France.

* cited by examiner

FIG. 4 – SGW BEHAVIOUR
- REFERENCE MODEL

- CASE WHEN RECEIVE DL DATA IN ECM IDLE

FIG. 5 – SGW

CONNECTION STATES FOR A USER ENTITY IN A SERVING GATEWAY OF AN EVOLVED PACKET CORE SYSTEM

TECHNICAL FIELD

This invention relates to methods and apparatuses for a packet core network for dealing with the status of user entities especially from the viewpoint of a serving gateway node.

BACKGROUND

In LTE, the user entity can be in three states: DETACHED, ECM-IDLE and ECM-CONNECTED. In ECM-IDLE state the position of the user entity is known to be within a so called traffic area corresponding to a plurality of cells. In ECM-CONNECTED state the position of the user entity is known to be within a given cell of an eNodeB in a given traffic area.

FIG. 1 shows key nodes of the evolved packet core (EPC) system. There is shown a packet data network (PDN) gateway node PGW, a serving gateway node, SGW, a mobility management entity, MME, a base station, eNodeB, and a user entity UE. The S11 interface between the MME and the SGW is shown. Moreover, the S5/S8 interface between PGW and SGW, the S1-U interface between SGW and eNodeB; and the S1-MME interface between the MME and eNodeB are shown. Key functionalities in the system involves control plane tunnels GTP-C between the PGW, the SGW and the MME and user plane tunnels between the PGW, SGW and the eNodeB. Payload data is transmitted via the user plane tunnel for a given user entity and control information for the user entity is transmitted via the control plane tunnels. There is moreover a S4 interface leading to a S4 interface capable SGSN.

ECM states are described in TS 23.401, section 4.6.3, which specifies that the UE and the MME shall enter the ECM-CONNECTED state when the signalling connection is established between the UE and the MME. Initial NAS messages that initiate a transition from ECM-IDLE to ECM-CONNECTED state are Attach Request and Service Request.

When the UE is in ECM-IDLE state, the UE and the network may be unsynchronized, i.e. the UE and the network may have different sets of established EPS bearers. When the UE and the MME enter the ECM-CONNECTED state, the set of EPS Bearers is synchronized between the UE and network. For a UE in the ECM-CONNECTED state, there exists a signalling connection between the UE and the MME. The signalling connection is made up of two parts: an RRC connection and an S1-MME connection.

The UE shall enter the ECM-IDLE state when its signalling connection to the MME has been released or broken. This release or failure is explicitly indicated by the eNodeB to the UE or detected by the UE. The S1 release procedure changes the state at both UE and MME from ECM-CONNECTED to ECM-IDLE. The SGW is always aware of the ECM state.

In ECM-CONNECTED, there is:
One GTP-C tunnel (per UE) on S11
One GTP-C tunnel per PDN connection on S5/S8
One GTP-U tunnel per bearer on S5/S8
One GTP-U tunnel per bearer on S1-U
In ECM-IDLE there is:
One GTP-C tunnel (per UE) on S11
One GTP-C tunnel per PDN connection on S5/S8
One GTP-U tunnel per bearer on S5/S8
No GTP-U tunnel(s) on S1-U. In FIG. 1, this tunnel is marked with dashed lines.

3GPP TS 23.401 describes procedures for a UE to attach to the network.
Section 5.3.2.1 E-UTRAN Initial Attach
Section 5.3.2.2 UTRAN/GERAN Initial Attach
Section 5.5.1.2 S1-based handover (with SGW change)
Section 5.5.2 Inter RAT handover (several cases)
Section 5.10.2 UE requested PDN connectivity All these scenarios are based on the same message sequence initiated by the MME: The MME first sends a Create Session Request message 102 to the SGW, then a Modify Bearer Request 107, as shown in the message sequence in FIG. 2.

For the Initial Attach procedure, the Create Session Request message 102 and the subsequent create session response message 115 are used for setting up a control-plane tunnel GTP-C on S11/S4 between the MME and the SGW, a control plane tunnel GTP-C on S5/S8 between the SGW and the PGW, and one user plane tunnel GTP-U on S5/S8 (between the SGW and the PGW).

The Modify Bearer Request message 107 and the subsequent Modify Bearer Response message 123 are then used for putting the UE in state ECM-CONNECTED, whereby a user plane GTP-U tunnel is set up between the SGN and the eNodeB. The message contains the S1-U eNodeB F-TEID that the SGW needs to forward downlink data to the eNodeB.

3GPP TS 23.401 version 9.3.0 deals among others with the so-called attach procedure which is shown in section 5.3.2 and most notably in FIG. 5.3.2.1-1. Key elements of this procedure, namely the create session request message 102, create session response 115, the modify bearer request message 107, the modify bearer response 123 and the ECM connected state 110 are shown in FIG. 2 of the present document.

The standard says nothing about the ECM state in the time between Create Session Request and Modify Bearer Request. Moreover, the standard gives no information on how the network nodes should handle the case in which the Modify Bearer Request never reaches the SGW.

One problem is that if no modify bearer request is received from the mobility management entity, resources are bound in the packet gateway node unnecessarily One way of dealing with this problem as envisioned by the inventors could be as follows: If no Modify Bearer Request is received, there will be a "hanging" PDN connection in SGW and PGW. Next time the same UE attempts to attach, the MME will (probably) use the same EPS Bearer ID for the default bearer. When the SGW/PGW receives a new Create Session Request it checks (by IMSI) if it already has a PDN connection for that UE. The SGW/PGW checks if the EPS Bearer ID in the Create Session Request is already in use. If it is already in use, the node deletes the existing PDN connection locally (without signalling to other nodes) and handles the new Create Session Request message as usual.

A technical problem with such a solution is that the serving gateway node may still be prone to take up resources unnecessarily for the user entity connection.

SUMMARY

It is a first object of the invention to provide for a resource efficient way to handle the case of lacking MME response where for example an Attach procedure is interrupted prematurely.

This object has been achieved by a method for a serving gateway node being adapted for operating in a network in which a control-plane tunnel between a mobility management entity and a serving gateway node, a control plane tunnel between the serving gateway node and a packet gateway node, and one or more user plane tunnels between the serving gateway node and the packet gateway node, may be set up. The serving gateway node is adapted for entering a state of ECM-IDLE and ECM-CONNECTED for a user entity in question. The method comprising the steps of upon reception of a Modify Bearer Request message, effectuating a setting up one or more user plane tunnels between the serving gateway node and a base station, and upon receiving a Create Session Request message from the mobility management entity or upon transmitting a Session Request Response message to the mobility management entity, setting a timer, which on time-out effectuating the serving gateway node to put the user entity in ECM-IDLE even if no Modify Bearer Request is received.

According to a further aspect of the invention wherein after the timer is set and before it is expired as time-out, effectuating to put the user entity in ECM-IDLE upon receiving a Modify Bearer Request message without any S1-U eNodeB Fully Qualified Tunnel Endpoint Identifier.

According to a further aspect, wherein after the timer is set and before it is expired as time-out, effectuating to adopt an ECM-CONNECTED status upon receiving a Modify Bearer Request message with eNodeB Fully Qualified Tunnel Endpoint Identifier.

According to a still further aspect, wherein once an ECM-IDLE status has been set, and the serving gateway node is subsequently receiving a Downlink Data Notification Acknowledge message, and furthermore finding that the request has been accepted and subsequently receiving a Modify Bearer request from the mobility management entity or a S4-Serving GPRS Support Node with eNodeB Fully Qualified Tunnel Endpoint Identifier, setting the status for the user entity as ECM-CONNECTED.

According to a still further aspect, wherein once an ECM-IDLE status has been set and the serving gateway node subsequently receives a Downlink Data Notification Acknowledge message, and furthermore finding that a context is not found, sending a Delete Session Request message to the packet gateway node, and deleting a context for the packet data network connection.

According to a further aspect there is provided a serving gateway node being adapted for operating in a network in which a control-plane tunnel between a mobility management entity and a serving gateway node, a control plane tunnel between the serving gateway node and a packet gateway node, and one or more user plane tunnels between the serving gateway node and the packet gateway node, may be set up, the serving gateway node comprising an application layer control mechanism, interface means, and a data base, wherein the application layer control mechanism is adapted for controlling whether the serving gateway node is entering a state of ECM-IDLE and ECM-CONNECTED for a user entity in question. The serving gateway node upon reception of a Modify Bearer Request message may effectuate a setting up one or more user plane tunnels between the serving gateway node and a base station. Once an ECM-IDLE status has been set and the serving gateway node subsequently receives a Downlink Data Notification Acknowledge message, and furthermore finding that a context is not found, the serving gateway node being adapted for sending a Delete Session Request message to the packet gateway node, and deleting a context for the packet data network connection.

Hence, the invention provides mechanisms for the connection to be either restored or removed after for example an interrupted Attach procedure.

There is moreover provided a serving gateway node being adapted for operating in a network in which a control-plane tunnel between a mobility management entity and a serving gateway node, a control plane tunnel between the serving gateway node and a packet gateway node, and one or more user plane tunnels between the serving gateway node and the packet gateway node, may be set up. The serving gateway node comprises an application layer control mechanism, interface means, and a data base. The application layer control mechanism is adapted for controlling whether the serving gateway node is entering a state of ECM-IDLE and ECM-CONNECTED for a user entity in question.

The serving gateway node upon reception of a Modify Bearer Request message may effectuate a setting up one or more user plane tunnels between the serving gateway node and a base station.

The serving gateway node is moreover being adapted to upon receiving a Create Session Request message from the mobility management entity or upon transmitting a Session Request Response message to the mobility management entity, set up a timer, which on time-out effectuates the serving gateway node to put the user entity in ECM-IDLE even if no Modify Bearer Request is received.

According to a further aspect of the invention there is provided a serving gateway node being adapted for operating in a network in which a control-plane tunnel between a mobility management entity and a serving gateway node, a control plane tunnel between the serving gateway node and a packet gateway node, and one or more user plane tunnels between the serving gateway node and the packet gateway node, may be set up, the serving gateway node comprising an application layer control mechanism, interface means, and a data base, wherein the application layer control mechanism is adapted for controlling whether the serving gateway node is entering a state of ECM-IDLE and ECM-CONNECTED for a user entity in question. The serving gateway node upon reception of a Modify Bearer Request message may effectuate a setting up one or more user plane tunnels between the serving gateway node and a base station. Once an ECM-IDLE status has been set and the serving gateway node subsequently receives a Downlink Data Notification Acknowledge message, and furthermore finding that a context is not found, the serving gateway node being adapted for sending a Delete Session Request message to the packet gateway node, and deleting a context for the packet data network connection.

Further advantages of the invention will appear from the following detailed description of the invention.

DETAILED DESCRIPTION OF PREFERRED EMBODIMENTS OF THE INVENTION

An embodiment of the invention is shown in FIGS. 5, 6, 7, 8 and 9.

Figure 1:
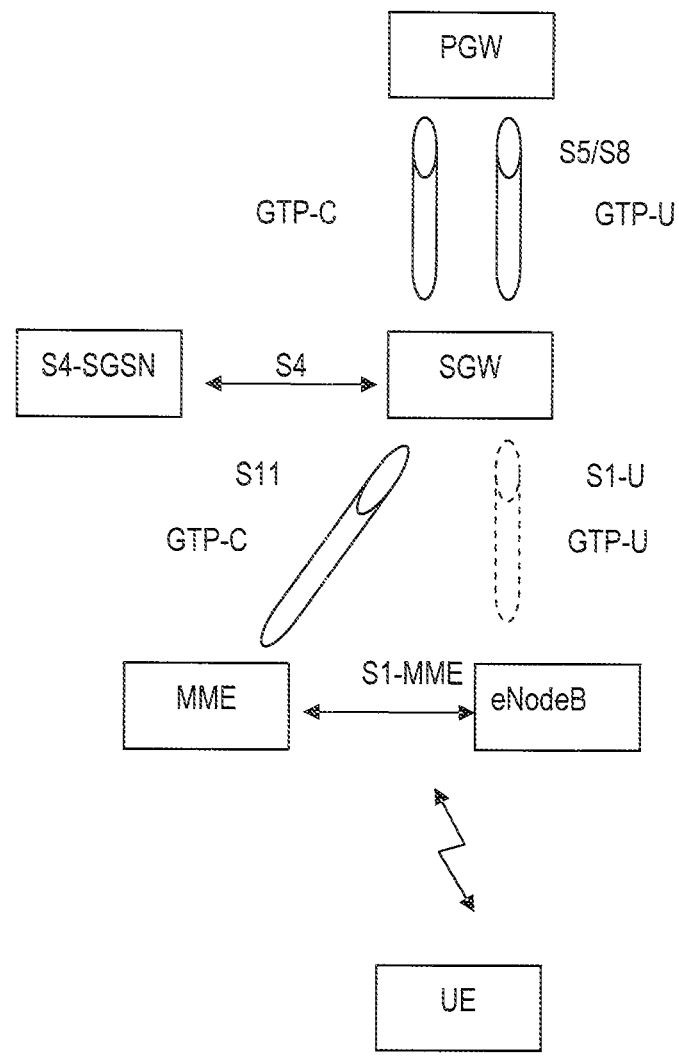
FIG. 1 shows elements of an evolved packet core network and key 3GPP packet based tunnels.
Figure 2:
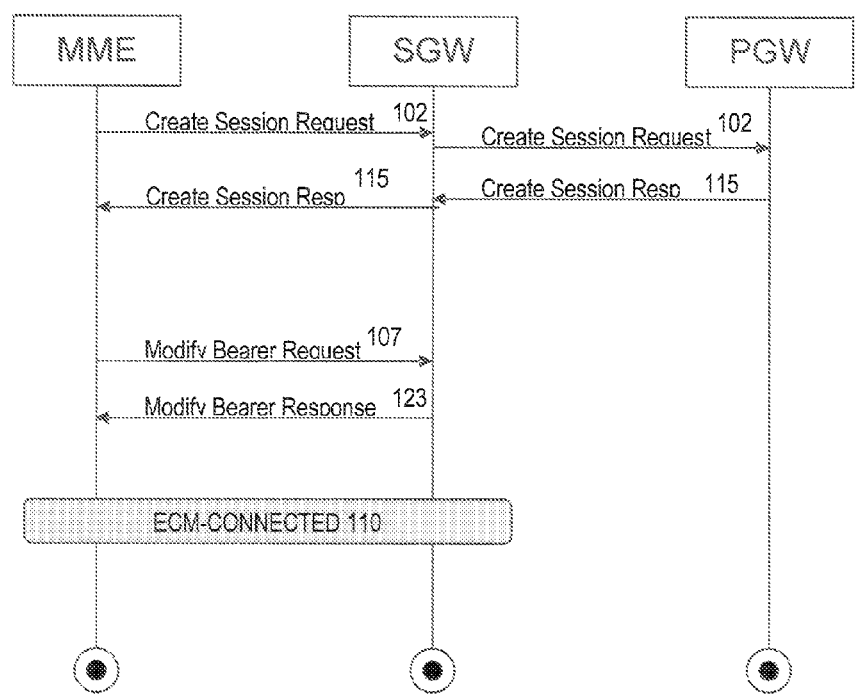
FIG. 2 shows known signalling messages that involves the SGW in the Initial Attach procedure and which leads to a GTP (GPRS Tunnel Protocol) user plane (GTP-U) tunnel being established between the SGW and the eNodeB shown in FIG. 1.
Figure 3:
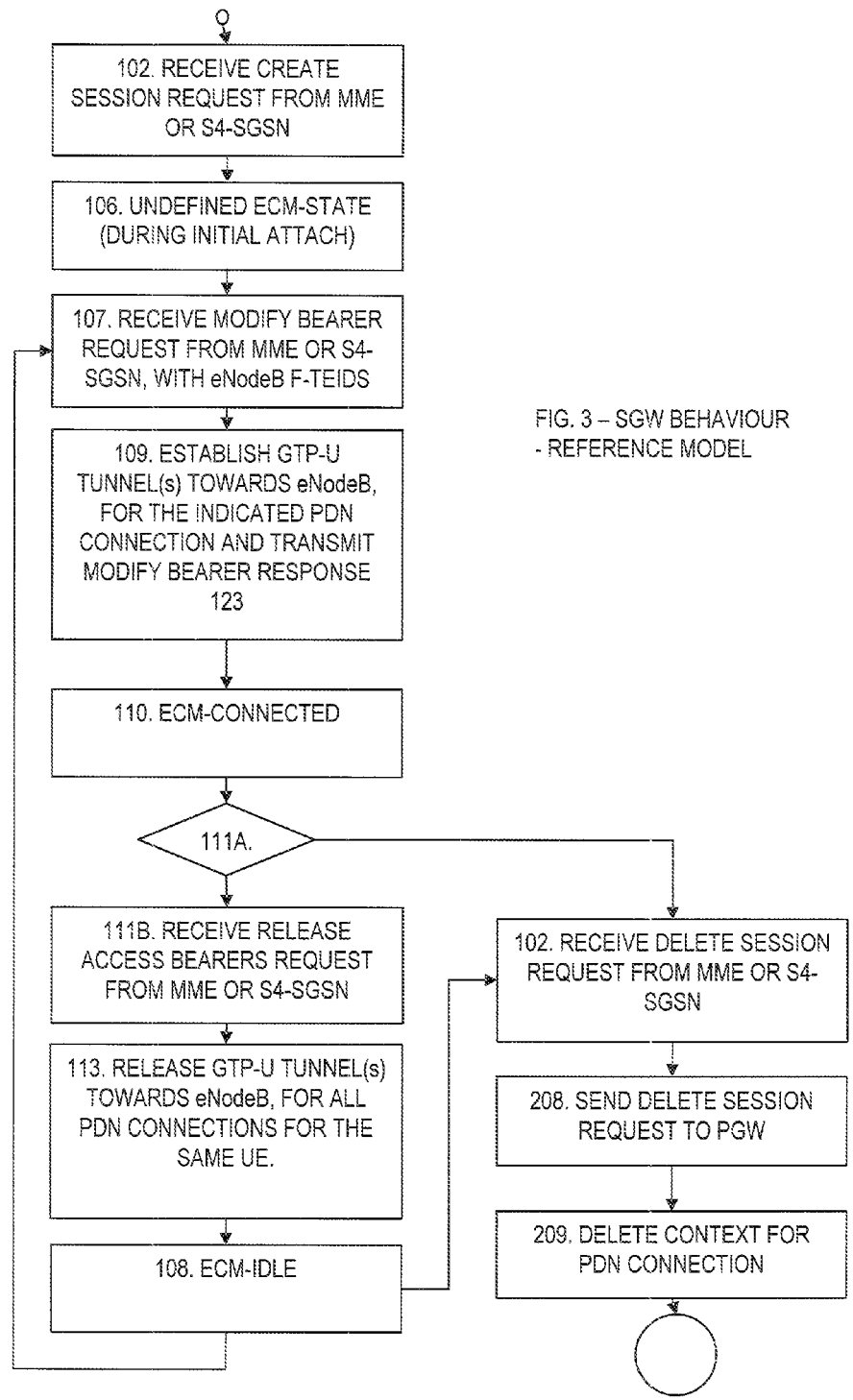
FIG. 3 shows the behavior of an internal reference model SGW node (not prior art as such) which should support the ECM-CONNECTED and ECM-IDLE states according to the prior art.
Figure 5:
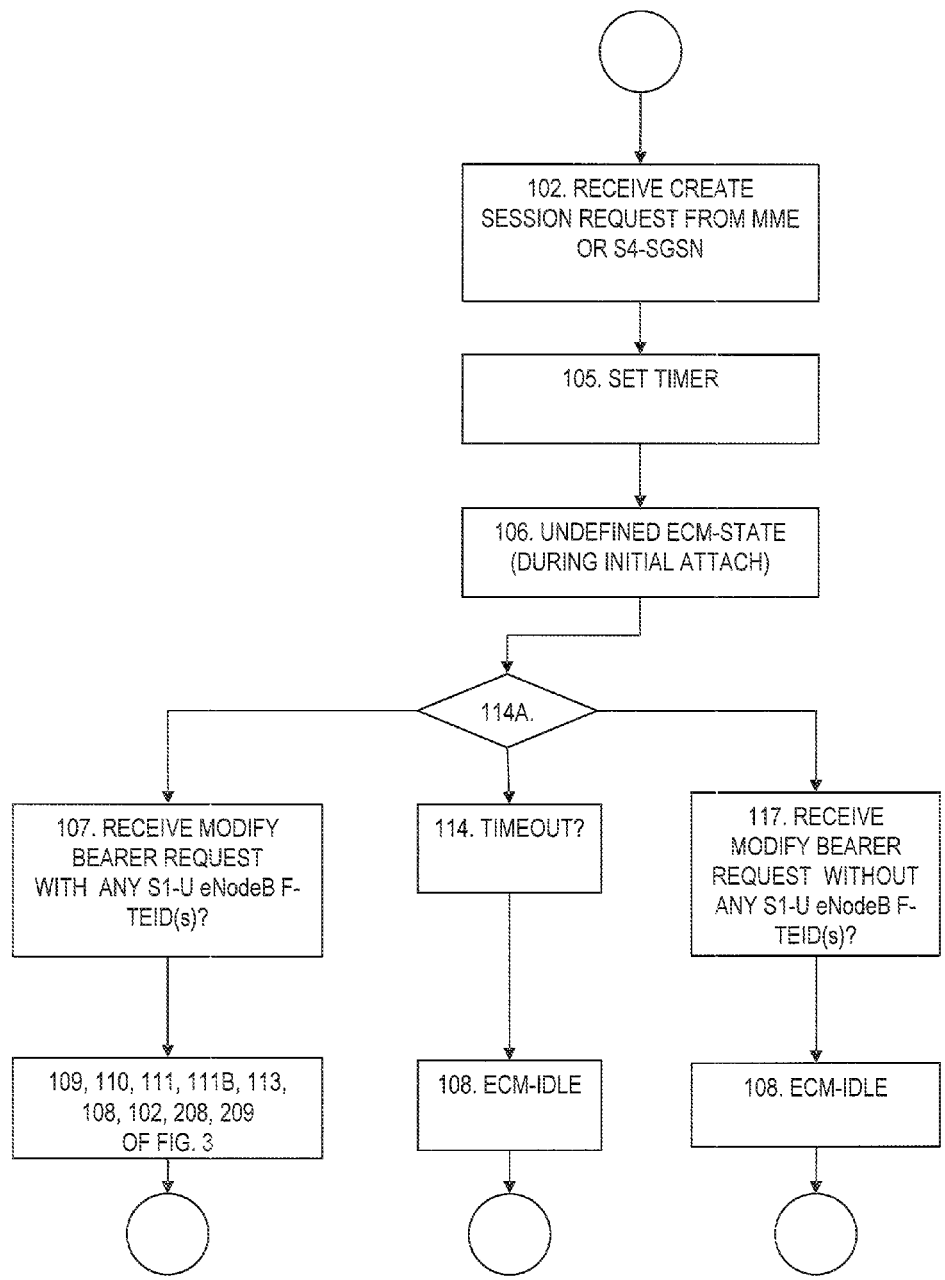
FIG. 5 shows method steps relating to an embodiment of a method according the invention for the SGW according to the invention wherein reference is also made to FIG. 3.
Figure 6:
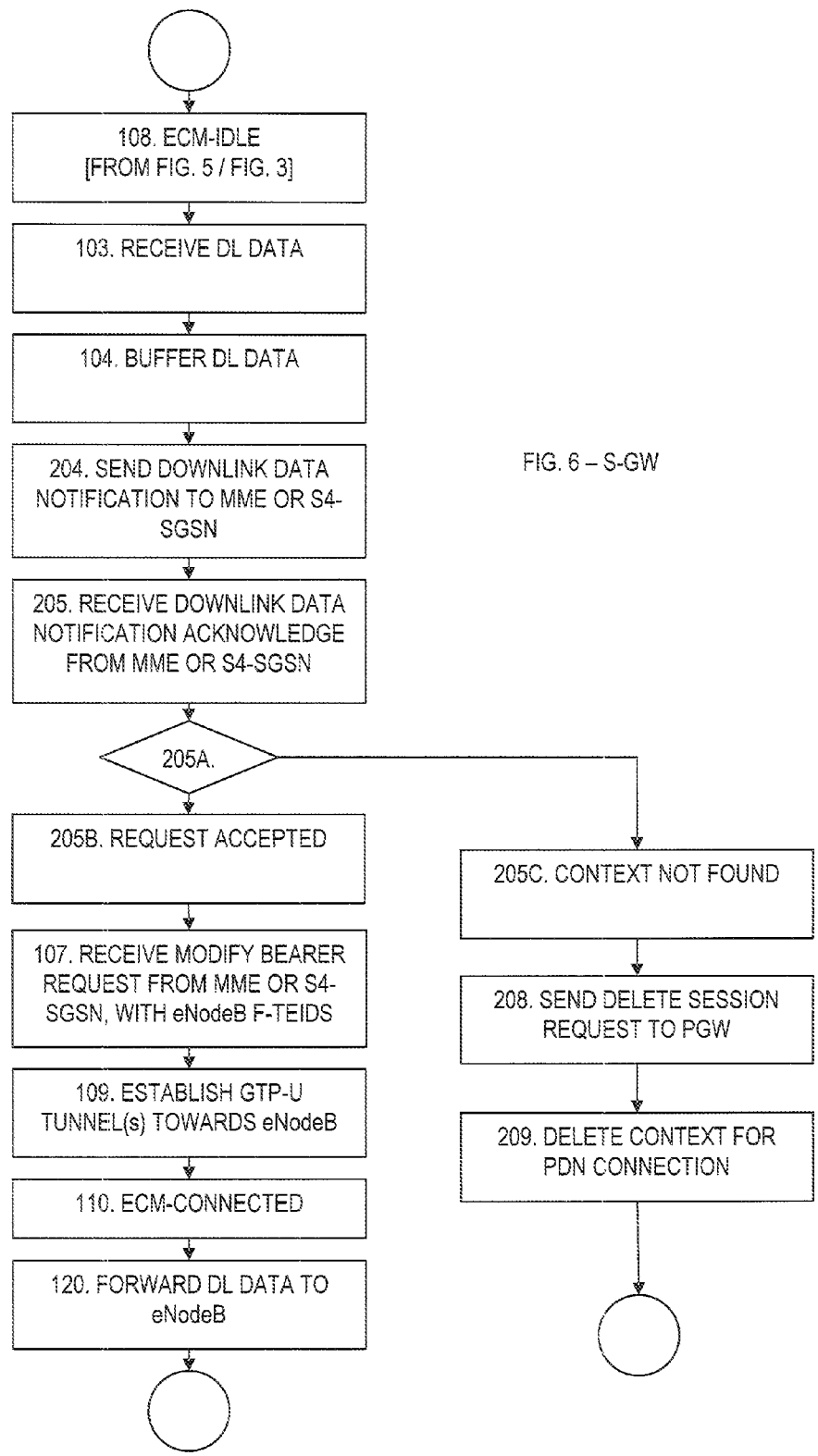
FIG. 6 shows further aspects relating to the embodiment of the method shown in FIG. 5 and also relating to a further separate embodiment.

FIG. 5 shows method steps relating to an embodiment of a method according for the SGW according to the invention wherein reference is also made to FIG. 3, and FIG. 6 shows further details relating to the embodiment of the method shown in FIG. 5.

Figure 7:
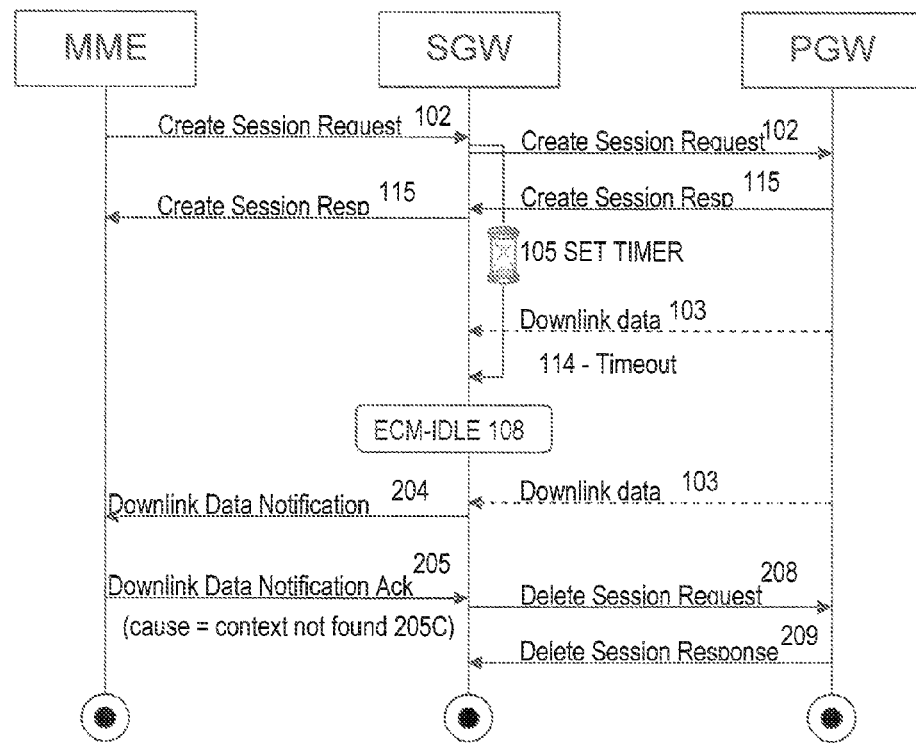
FIG. 7 shows a situation where a connection is removed after an interrupted Attach procedure according to an embodiment of invention.
Figure 8:
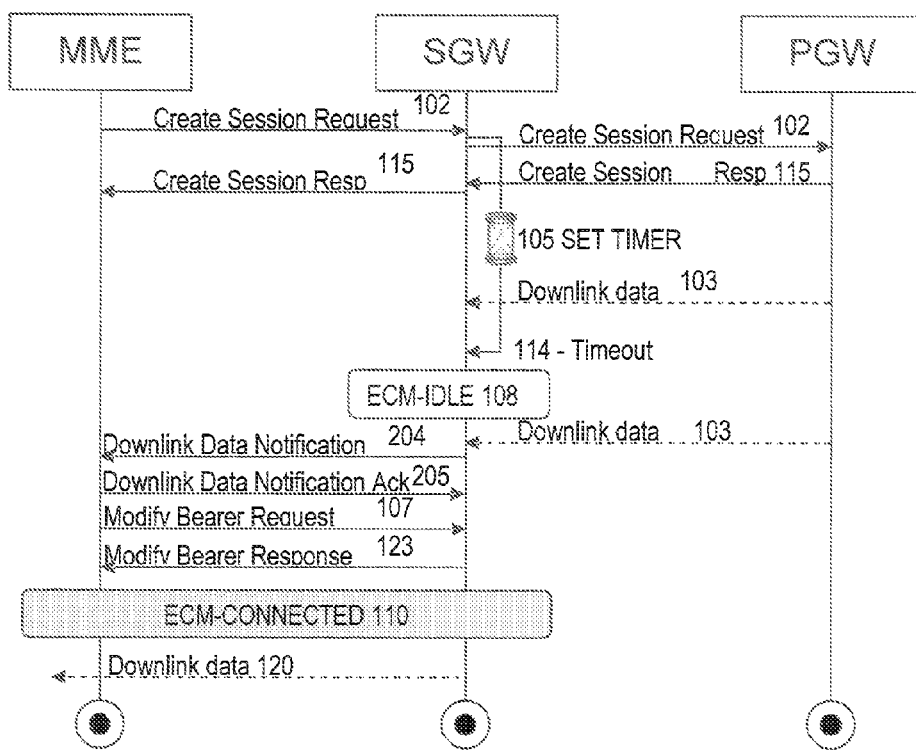
FIG. 8 shows another situation where the connection is restored successfully after an interrupted Attach procedure according to an embodiment of the invention.

FIG. 7 shows a situation where a connection is removed after an interrupted Attach procedure according to a first embodiment of the invention, while FIG. 8 shows a situation where the connection is restored successfully after an interrupted Attach procedure ac cording to a further aspect of the first embodiment of the invention.

However, before turning to the invention, the functionality of an internal non-published reference model of the applicant will be explained. This model is supposed to function in compliance with the prior art LTE standards discussed above and is illustrated in FIG. 3 and FIG. 4. The functionality is the following:

When in 102 a Create Session Request is received from the MME or S4-SGSN, the method proceeds to 106, where the SGW adapts an undefined ECM state, during the Initial Attach procedure.

In step 107, a Modify Bearer Request from MME or S4 SGSN, with eNodeB F-TEIDS is received.

In step 109, a GTP-U tunnel is established towards eNodeB for the default bearer indicated PDN connection and a Modify Bearer Response message 123 is issued to the MME.

When this is accomplished in the SGW, the status of PDN of the given user entity is in ECM-CONNECTED, 110.

In step 111A, the method branches on two conditions:

The path following step 111B is chosen when a Release Access Bearers Request from MME or S4-SGSN is received. The path following step 102 is chosen when a Receive Delete Session request to POW is received.

Following step 111B, in step 113, the GTP tunnels towards eNodeB, for all PDN connections for the same given UE are released and an ECM idle state is adopted, step 108.

Following step 102, a Send Delete Session Request is sent to PGW in step 208 and the context is deleted for the PDN connection, step 209.

Figure 4:
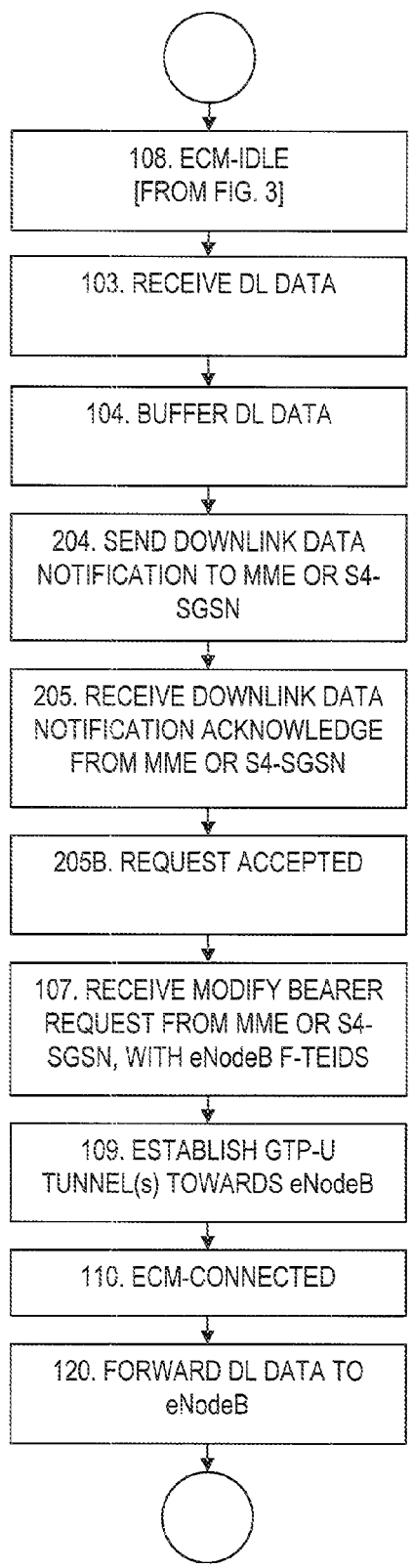
FIG. 4 shows further behavior of an internal reference model SGW node in FIG. 3.

In FIG. 4, the behaviour of the reference model for the case that downlink data 103 is received when the UE is in ECM-IDLE corresponding to state 108 in FIG. 3, is shown.

Downlink data is buffered according to step 104. In step 204, a Downlink Data Notification is sent.

The method proceeds if a Downlink Notification Acknowledge is received 205 from MME or S4 SGSN.

The method proceeds if a Modify Bearer Request from MME or S4-SGSN with eNodeB F-TEIDs is received, 107. Then in step 109, one or more GTP-U tunnels are established toward eNodeB and the SGW adopts an ECM connected state 110 for the PDN of the UE. Consequently, in step 120 downlink data is forwarded to eNodeB.

FIG. 5 shows method steps relating to an embodiment of a method according for the SGW according to the invention. In an initial situation, a Create Session Request 102 is received from MME or S4-SGSN.

After this has happened, a timer is set in step 105. Alternatively, the timer is set upon transmitting a Create Session Response message 115 to the mobility management entity.

An undefined ECM state is adopted in step 106 during the Initial Attach procedure.

Subsequently, up to three conditions are observed, which decides the following course of action at branching point 114A.

The first condition 107 is whether a Modify Bearer Request with S1-U eNodeB F-TEIDs signal is received. The second condition 114 is whether timeout of the timer set in step 105 has occurred. The third condition is whether a Modify Bearer Request without any S1-U eNodeB F-TEIDs is received.

In the latter two cases, the SGW adopts an ECM idle state 108.

In the first case the, the SGW goes to step 107 in FIG. 3 and undertakes steps 109, 110, 111A, 111B, 113, 108, 102, 208, and 209 as defined in FIG. 3.

FIG. 6 shows further method steps following step 108 of FIG. 5—where the ECM-IDLE state is being adopted—in FIG. 5—and where downlink data is received for the UE, 103. Alternatively, the FIG. 6 steps may be carried out as a separate embodiment, such that the method follows on ECM-IDLE 108 in FIG. 3.

This downlink data is buffered according to step 104. In step 204, a Downlink Data Notification is sent.

The method proceeds if a Downlink Notification Acknowledge is received 205 from MME or S4 SGSN.

In branch point 205A two conditions determine the further course of action. Either the request is found to be accepted 205B or the context is not found 2050.

In case 205B, the method proceeds if a Modify Bearer Request from MME or S4-SGSN with eNodeB F-TEIDs is received, 107. Then in step 109, one or more GTP-U tunnels are established toward eNodeB and the SGW adopts an ECM connected state 110 for the PDN of the UE. Consequently, in step 120 downlink data is forwarded to eNodeB.

In case 205C, where a Context is not found, a Delete Session Request is sent to PGW, step 208 and the Context is deleted for the PDN connection 209.

FIG. 7 shows a scenario where a connection is removed after an interrupted Attach procedure according to an embodiment of the invention based on the FIG. 6 method. The actions defined in FIGS. 5 and 6 and corresponding actions in FIG. 7 are shown having the same reference signs.

A Create Session Request 102 is received in the SGW from the MME. This is forwarded to the PGW, which replies by a Create session Response 115 that is forwarded from the SGW to the MME, 115. The Create Session Request starts the timer according to 105 in the FIG. 5 method.

Subsequently, downlink data 103 is received from PGW.

If the timer expires 114, before the other conditions occurred at branch point 114A, the method proceeds to 108 and sets the PDN in ECM-IDLE 108.

Subsequently steps, 108, 103 receive Downlink data, 104 buffer downlink data is performed and sending of Downlink Data Notification 204 according to the FIG. 6 method.

The Downlink Data Notification Acknowledge 205 message is used as a reply to the Downlink Data Notification message 204. It contains a Cause:

Cause=Request Accepted (Meaning: The MME will page the UE), 205B

Cause=Context Not Found, 205C, (Meaning: The MME does not know about the UE).

If Cause (above) was "Request accepted" 205B, the MME tries to page the UE.

Later, when the MME has tried paging the UE, one of two things can occur (depending on the result of the paging):

Paging was successful: MME sends Modify Bearer Request (with eNodeB F-TEIDs)

Paging was unsuccessful: MME sends Downlink Data Notification Failure Indication Hence, when the timer elapses, 114, the SGW according to the invention puts the UE in ECM idle (which from the outside appears as if the SGW starts acting as if the UE were in ECM-IDLE). In contrast, the 3GPP TS 23.401 standard assumes that the UE (as seen in the SGW) enters the ECM-CONNECTED state by the Modify Bearer Request message. The SGW can then enter the ECM-IDLE state by a Release Access Bearers Request message.

As shown in FIG. 7, upon the reception of Downlink Data Notification Acknowledgement 205 (cause=context not found, 205C), a Delete Session request 208 to PGW and a Delete Session Response 209 according to which the context is deleted for the PDN connection. All downlink data DL data 103 will in this case be discarded when SGW sends Delete Session Request 208 to the PGW According to the invention, this procedure frees resources in an effective manner in both the SGW and in the PGW.

FIG. 8 shows a situation where the connection is restored successfully after an interrupted Attach procedure according to the embodiment of the invention. Again, the same actions are denoted by the same reference signs.

The situation corresponds to the situation illustrated in FIG. 7, but after step 204 where Downlink Data Notification 204 is issued from SGW to MME, a Downlink Notification Acknowledge 205 is received.

In this case, the request is accepted 205B of FIG. 6. Upon the reception of a modify Bearer Request 107 from the MME with eNodeB TFEIDs—see left hand branch in FIG. 6—a Modify Bearer response 123 is subsequently awaited and issued from the MME or S4-SGSN and the SGW puts the PDN of the UE in status ECM-CONNECTED, 110. Subsequently, downlink data 120 is forwarded to eNodeB.

Figure 9:
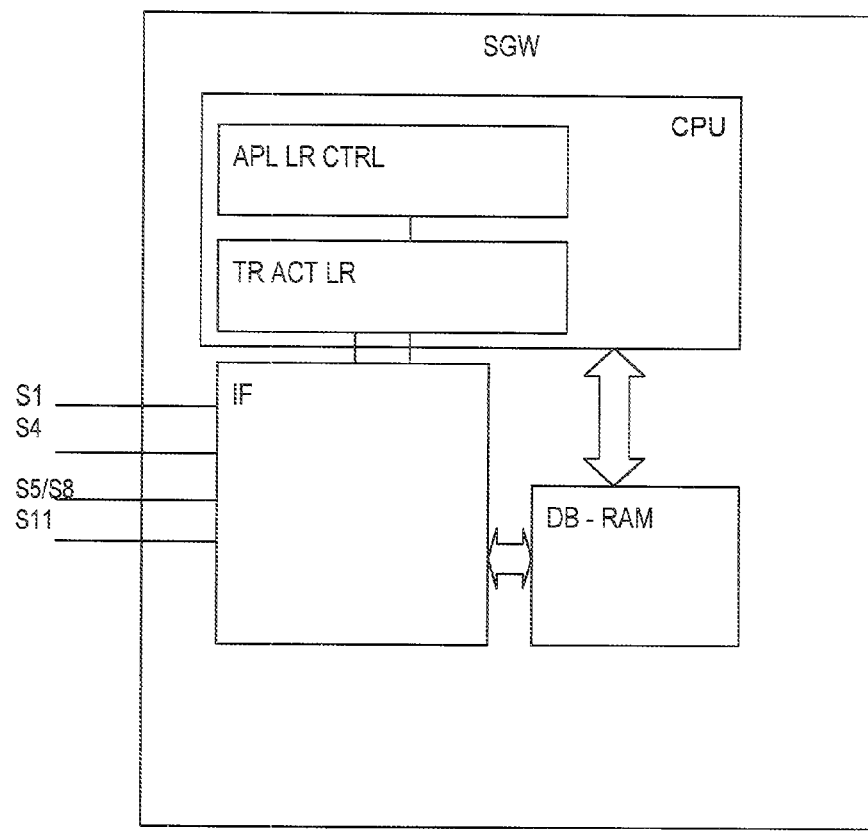
FIG. 9 shows an embodiment of a SGW according to the invention.

In FIG. 9, a SGW according to the invention is shown. The SGW comprises an application layer control mechanism APL LR CTRL, interface means, IF, and a data base, DB implemented in a random access memory RAM.

The method steps shown in FIGS. 6 and 7 are undertaken by the application layer control mechanism APL LR CTRL and specifically being adapted for controlling whether the serving gateway node (SGW) is entering a state of ECM-IDLE (108) and ECM-CONNECTED (110) for a user entity (UE) in question. There is also provided a transaction layer mechanism, TR ACT LR. Both these mechanisms may be performed by means of a central processing unit, CPU.

The signalling to and from the MME/S4 SGSN and the PGW entity, which may be physically situated together with the SGW, is performed by the interface means IF using the database DB. The interface means are provided with a S1 interface, S4 interface, S5/S8 interface and an S11 interface.

ABBREVIATIONS

GTP GPRS Tunnelling Protocol
eNodeB evolved (eUTRAN) Base station node
EPC Evolved Packet Core
EPS Evolved Packet System
E-UTRAN Evolved Universal Terrestrial Radio Access Network
F-TEID Fully Qualified Tunnel Endpoint Identifier
LTE Long Term Evolution
MME Mobility Management Entity
PGW PDN Gateway node
PDN Packet Data Network
SGW Serving Gateway node
S4 SGSN S4 interface supporting SGSN
SGSN Serving GPRS Support Node (2G/3G)
UE User Equipment

The invention claimed is:

1. A method implemented by a serving gateway node (SGW), the SGW operative to support a control-plane tunnel to a mobility management entity (MME), a control plane tunnel to a packet data network gateway node (PGW), and one or more user plane tunnels to the PGW, wherein the SGW is operative to cause a user equipment (UE) to enter an ECM-IDLE state or an ECM-CONNECTED state, the method comprising:

starting a timer upon receiving a Create Session Request message from the MME or upon transmitting a Session Request Response message to the MME;

causing the UE to enter the ECM-IDLE state if the timer expires prior to the SGW receiving a Modify Bearer Request message; and if a Modify Bearer Request message is received after the timer has been started and before the timer expires:

causing the UE to enter the ECM-IDLE state if the Modify Bearer Request message does not include a base station Fully Qualified Tunnel Endpoint Identifier (F-TEID); and causing the UE to enter the ECM-CONNECTED state if the Modify Bearer Request message includes a base station F-TEID.

2. The method of claim 1, further comprising causing the UE to enter the ECM-CONNECTED state responsive to:

the SGW receiving, while the UE is in the ECM-IDLE state, a Downlink Data Notification Acknowledge message indicating a requested downlink transmission has been accepted; and the SGW subsequently receiving a Modify Bearer Request message from the MME or a Serving General Packet Radio Service Support Node that includes a base station F-TEID.

3. The method of claim 1, further comprising, responsive to the SGW subsequently receiving, while the UE is in the ECM-IDLE state, a Downlink Data Notification Acknowledge message indicating that a context is not found:

sending a Delete Session Request message to the PGW; and deleting a context for a connection to the packet data network.

4. A serving gateway node (SGW) operative to support a control-plane tunnel to a mobility management entity (MME), a control plane tunnel to a packet data network gateway node (PGW), and one or more user plane tunnels to the PGW, the SGW comprising:

a memory; and a processing circuit that is operatively connected to the memory, operates as an application layer control mechanism, and is configured to:
- start a timer upon receiving a Create Session Request message from the MME or upon transmitting a Session Request Response message to the MME;
- cause the UE to enter the ECM-IDLE state if the timer expires prior to the SGW receiving a Modify Bearer Request message; and
- if a Modify Bearer Request message is received after the timer has been started and before the timer has expired:
    - cause the UE to enter the ECM-IDLE state if the Modify Bearer Request message does not include a base station Fully Qualified Tunnel Endpoint Identifier (F-TEID); and
    - cause the UE to enter the ECM-CONNECTED state if the Modify Bearer Request message includes a base station F-TEID.

5. The SGW of claim 4, wherein the processing circuit is further configured to cause the UE to enter the ECM-CONNECTED state responsive to:
- the SGW receiving, while the UE is in the ECM-IDLE state, a Downlink Data Notification Acknowledge message indicating a requested downlink transmission has been accepted; and
- the SGW subsequently receiving a Modify Bearer Request message from the MME or a Serving General Packet Radio Service Support Node that includes a base station F-TEID.

6. The SGW of claim 4, wherein the processing circuit is further configured to, responsive to the SGW subsequently receiving, while the UE is in the ECM-IDLE state, a Downlink Data Notification Acknowledge message indicating that a context is not found:
- send a Delete Session Request message to the PGW; and
- delete a context for a connection to the packet data network.

* * * * *

UNITED STATES PATENT AND TRADEMARK OFFICE
CERTIFICATE OF CORRECTION

PATENT NO. : 9,232,544 B2  
APPLICATION NO. : 13/699374  
DATED : January 5, 2016  
INVENTOR(S) : Sundell et al.

Page 1 of 1

It is certified that error appears in the above-identified patent and that said Letters Patent is hereby corrected as shown below:

In the Specification

In Column 5, Line 56, delete "POW" and insert -- PGW --, therefor.

In Column 6, Line 44, delete "2050." and insert -- 205C. --, therefor.

In the Claims

In Column 8, Line 21, delete "by a serving" and insert -- by serving --, therefor.

Signed and Sealed this  
Fifth Day of July, 2016

Michelle K. Lee  
*Director of the United States Patent and Trademark Office*